United States Patent
Haggar et al.

(10) Patent No.: US 8,127,235 B2
(45) Date of Patent: Feb. 28, 2012

(54) AUTOMATIC INCREASING OF CAPACITY OF A VIRTUAL SPACE IN A VIRTUAL WORLD

(75) Inventors: Peter F. Haggar, Raleigh, NC (US);
Brian R. Bokor, Raleigh, NC (US);
Daniel E. House, Raleigh, NC (US);
William B. Nicol, II, Durham, NC (US);
Andrew B. Smith, Morrisville, NC (US); Luis J. Ostdiek, Orangevale, CA (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 11/947,829

(22) Filed: Nov. 30, 2007

(65) Prior Publication Data
US 2009/0144638 A1    Jun. 4, 2009

(51) Int. Cl.
*G06F 3/048* (2006.01)

(52) U.S. Cl. ......... 715/757; 715/763; 715/764; 715/866

(58) Field of Classification Search .................. 715/757, 715/764, 863, 861, 758
See application file for complete search history.

(56) References Cited

U.S. PATENT DOCUMENTS
6,772,195 B1 *  8/2004  Hatlelid et al. ............... 709/204
(Continued)

*Primary Examiner* — Tadeese Hailu
(74) *Attorney, Agent, or Firm* — Moore & Van Allen PLLC; Charles L. Moore (57) ABSTRACT

A system and method for automatically increasing a capacity of a virtual space in a virtual world. It is determined if an allowable number of avatars are currently in the virtual space, and a capacity of the virtual space is increased when the allowable number of avatars are currently in the virtual space. The capacity of the virtual space may be increased by spawning a replicate new virtual space. The capacity of the virtual space may also be increased by expanding a size of the virtual space. The virtual space may include any type of virtual space such as for example, a store, a business, an arena, a building, a land area, a room, etc. The allowable number of avatars may be a maximum avatar capacity for the virtual space, or may be an ideal avatar capacity for the virtual space.

13 Claims, 9 Drawing Sheets

U.S. PATENT DOCUMENTS

| | | | |
|---|---|---|---|
| 6,985,937 B1 * | 1/2006 | Keshav et al. | 709/223 |
| 7,386,799 B1 * | 6/2008 | Clanton et al. | 715/758 |
| 7,509,369 B1 * | 3/2009 | Tormasov | 709/201 |
| 7,587,492 B2 * | 9/2009 | Dyck et al. | 709/226 |
| 7,814,154 B1 * | 10/2010 | Kandekar et al. | 709/205 |
| 2002/0015003 A1 * | 2/2002 | Kato et al. | 345/1.1 |
| 2008/0059972 A1 * | 3/2008 | Ding et al. | 718/105 |
| 2009/0077158 A1 * | 3/2009 | Riley et al. | 709/202 |
| 2009/0077475 A1 * | 3/2009 | Koster et al. | 715/757 |
| 2009/0089157 A1 * | 4/2009 | Narayanan | 705/14 |

* cited by examiner

AUTOMATIC INCREASING OF CAPACITY OF A VIRTUAL SPACE IN A VIRTUAL WORLD

BACKGROUND OF THE INVENTION

The present invention is related to virtual space in a virtual world, and more specifically to automatic increasing of capacity of a virtual space in a virtual world.

Virtual reality (VR) worlds bring the best of online and real-world brick and mortar to many scenarios, for example shopping. In the brick and mortar worlds, shopping has both a social and a visually immersive experience. Two dimensional (2D) shopping web sites are convenient (e.g., they do not require traveling to a physical location) and scalable to 1,000s of users by a hosting server. However, they lack that social and visual experience of brick and mortar. Today three dimensional (3D) web sites combine the convenience of online shopping with the social and the visual benefits of brick and mortar. However, they suffer from the scalability issue of brick and mortar.

Current virtual worlds, (e.g., Second Life), differ from traditional 2D web sites in many ways. One way is that if you are looking at a page on the Circuit City® web site, you don't know if you are the only one looking at that page or if there are thousands or perhaps tens of thousands of other users looking at that page at the same time. In virtual worlds, to see something you must be in a particular location to view it. When there are too many avatars in a particular location at the same time, it creates congestion not just for the user who has to attempt to move around all the other avatars, but also for the server that is running that particular virtual space in the virtual world. Therefore, if someone is running a store in a virtual world, they may only want to allow a certain number of avatars in at a time to facilitate a good shopping and user experience as well as control the load on the server running that store. However, a problem exists in that if the store is full, the next avatar desiring access to the store has to be turned away. Currently, one solution to this problem is that when a virtual world store effectively closes, the avatar is put on a waiting list to enter. This is unacceptable to users who will not want to be denied.

BRIEF SUMMARY OF THE INVENTION

According to one aspect of the present invention, a method for automatically increasing a capacity of a virtual space in a virtual world that includes detecting an attempt by an avatar to enter a virtual space in a virtual world, determining if an allowable number of avatars are currently in the virtual space, and increasing a capacity of the virtual space when the allowable number of avatars are currently in the virtual space.

According to another aspect of the present invention, a method for automatically increasing a capacity of a virtual space in a virtual world that includes determining if an allowable number of avatars are currently in the virtual space, and increasing a capacity of the virtual space when the allowable number of avatars are currently in the virtual space.

According to a further aspect of the present invention, a system for automatically increasing a capacity of a virtual space in a virtual world includes a server, one or more workstations, and a network interconnecting the server and one or more workstations, wherein the server hosts a virtual world allowing a user at the one or more workstations to control an avatar in the virtual world to access a virtual space, the server detecting an attempt by an avatar to enter the virtual space in the virtual world, determining if an allowable number of avatars are currently in the virtual space, and increasing a capacity of the virtual space when the allowable number of avatars are currently in the virtual space.

According to a still further aspect of the present invention, a computer program product comprising a computer useable medium having computer useable program code embodied therewith, the computer useable program code comprising computer useable program code configured to detect an attempt by an avatar to enter a virtual space in a virtual world, computer useable program code configured to determine if an allowable number of avatars are currently in the virtual space, and computer useable program code configured to increase a capacity of the virtual space when the allowable number of avatars are currently in the virtual space.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to automatically increasing a capacity of a virtual space in a virtual world allowing avatars to enter that would otherwise be put on hold until space is available or denied entry and turned away. A virtual space may be any type or form of virtual space in a virtual world, such as, for example, a store, a business, an arena, a building, a land area, an open space, a room, etc. When an avatar attempts to enter a virtual space in a virtual world, it is determined if an allowable number of avatars are currently in the virtual space and if so, a capacity of the virtual space may be automatically increased. Thus the avatar desiring entry is not turned away or denied.

Owners or managers of a virtual space in a virtual world may set a threshold for the number of avatars that are allowed in the virtual space at any given time to limit overcrowding. A threshold number of allowed avatars may be related to a number for an ideal avatar capacity for the virtual space or may be related to a number for a maximum avatar capacity for the virtual space. The threshold number of avatars may be set based on any one of a variety of factors such as, for example, how large the area is (e.g., the larger the area the more avatars it can hold at one time and still have a positive user experience), how large the server capacity is that is hosting the virtual space in the virtual world, etc. Even if more avatars can fit into the "physical" size of a virtual space area, it may be desired to limit the number of avatars in a virtual space on a given server. For example, if a threshold limit of allowable avatars is set to twenty, when a twenty-first avatar attempts to enter the virtual space, embodiments according to the present invention dynamically increase a capacity of the virtual space in the virtual world.

The virtual space may be automatically increased by dynamically spawning a replicate virtual space or by expanding the physical size of the area of the virtual space. If a replicate virtual space is spawned, this may occur on another partition on the same server hosting the original virtual space or on a different server. Once the new avatar enters a spawned replicate virtual space, initially, the avatar may be alone in the new virtual space while the original virtual space may still be at capacity or at the desired threshold of allowable avatars. Thus, embodiments according to the present invention allow an owner or manager of a virtual space to provide access to avatars without having to turn an avatar away or allow an unlimited number of avatars into the virtual space and have the avatars, or users controlling the avatars, frustrated by a less than desirable experience due to overcrowding in the virtual space.

According to embodiments of the present invention, a manager or owner of a virtual space may define various settings for the virtual space related to avatar access and/or increasing a capacity of the virtual space. A virtual space may have associated settings such as, for example, a maximum avatar capacity for the virtual space, an ideal avatar capacity for the virtual space, a limit on a number of replicate new virtual spaces that may be spawned from the virtual space, a limit on an expansion of a physical size of the virtual space, etc. The capacity for the virtual space may be automatically increased based on an ideal avatar capacity for the virtual space being reached or a maximum avatar capacity for the virtual space being reached, or any other type criteria or setting.

Figure 1:
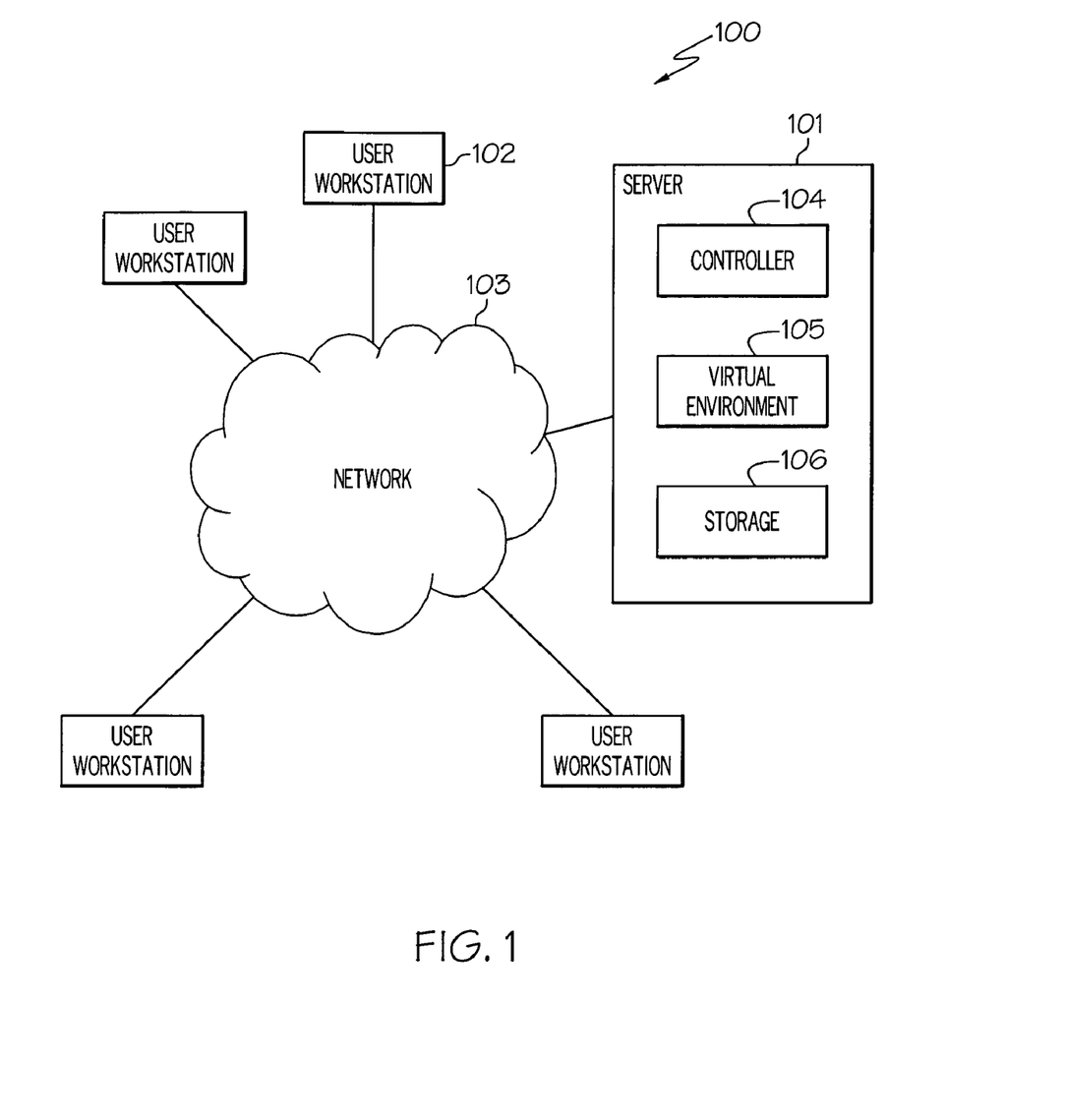
FIG. 1 is a diagram of system for automatically increasing a capacity of a virtual space in a virtual world according to an example embodiment of the present invention.

FIG. 1 shows a diagram of system for automatically increasing a capacity of a virtual space in a virtual world according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to access a virtual space. An owner or supplier of the service, the item, the event or the virtual space may also access the virtual world or environment 105, hosted on the server 101, via one or more workstations 102 and control an avatar to provide or restrict access to the virtual space. The server 101 may detect an attempt by an avatar to enter a virtual space in the virtual world, determine if an allowable number of avatars are currently in the virtual space, and increase a capacity of the virtual space when the number of allowable avatars is currently in the virtual space.

Figure 2:
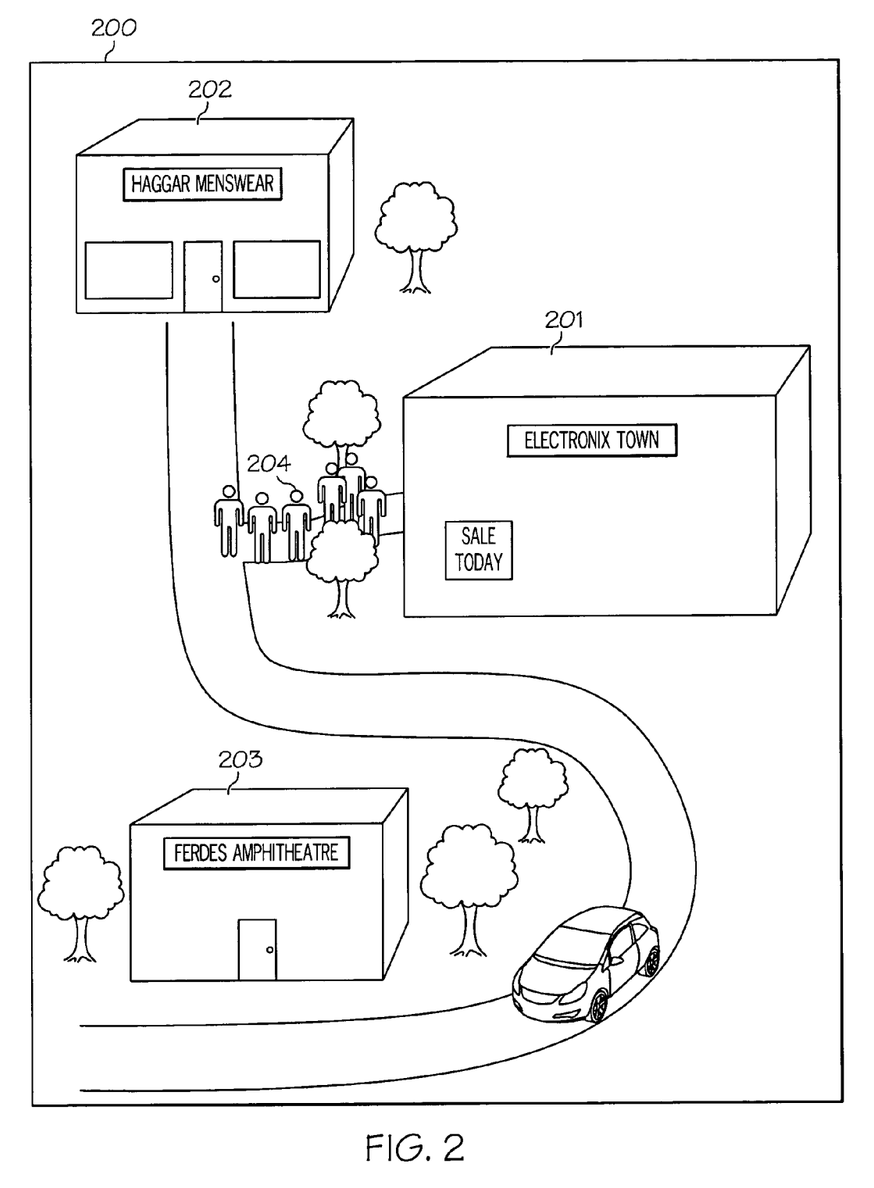
FIG. 2 is a diagram of virtual environment for automatically increasing a capacity of a virtual space in a virtual world according to an example embodiment of the present invention.

FIG. 2 shows a diagram of virtual environment for automatically increasing a capacity of a virtual space in a virtual world according to an example embodiment of the present invention. In the virtual environment/world 200 there may exist an environment containing buildings, stores, trees, cars, people (represented by avatars) and any other items that currently exist in the real world. For example, a virtual world may contain virtual businesses, stores, venues, or other virtual spaces 201, 202, 203 that allow an avatar 204 access to a virtual space.

In this example embodiment, a user may desire to control an avatar 204 to access a virtual space in a virtual world such as, for example, "Electronix Town" 201 to shop for electronics, "Haggar Menswear" 202 to shop for clothing, "Ferdes Amphitheatre" 203 to attend a music or cultural event, etc. The avatar may also desire access to any other types of virtual spaces such as, for example, any type of store, business, arena, building, land area, room, etc. As noted previously, once an attempt by an avatar to enter a virtual space in the virtual world is detected, it may be determined if an allowable number of avatars are currently in the virtual space, and a capacity of the virtual space may be increased when the allowable number of avatars are currently already in the virtual space. For example, if an avatar 204 desires to enter the virtual space "Electronix Town" 201 to shop for electronics, if it is determined that the "Electronix Town" store 201 already has an allowable number of avatars in the store, a capacity of the "Electronix Town" 201 store may be increased, this allowing the avatar 204 to access the store. The capacity of the virtual space may be increased by spawning a replicate new "Electronix Town" virtual space, or by expanding a size of the "Electronix Town" 201 virtual space.

Figure 3:
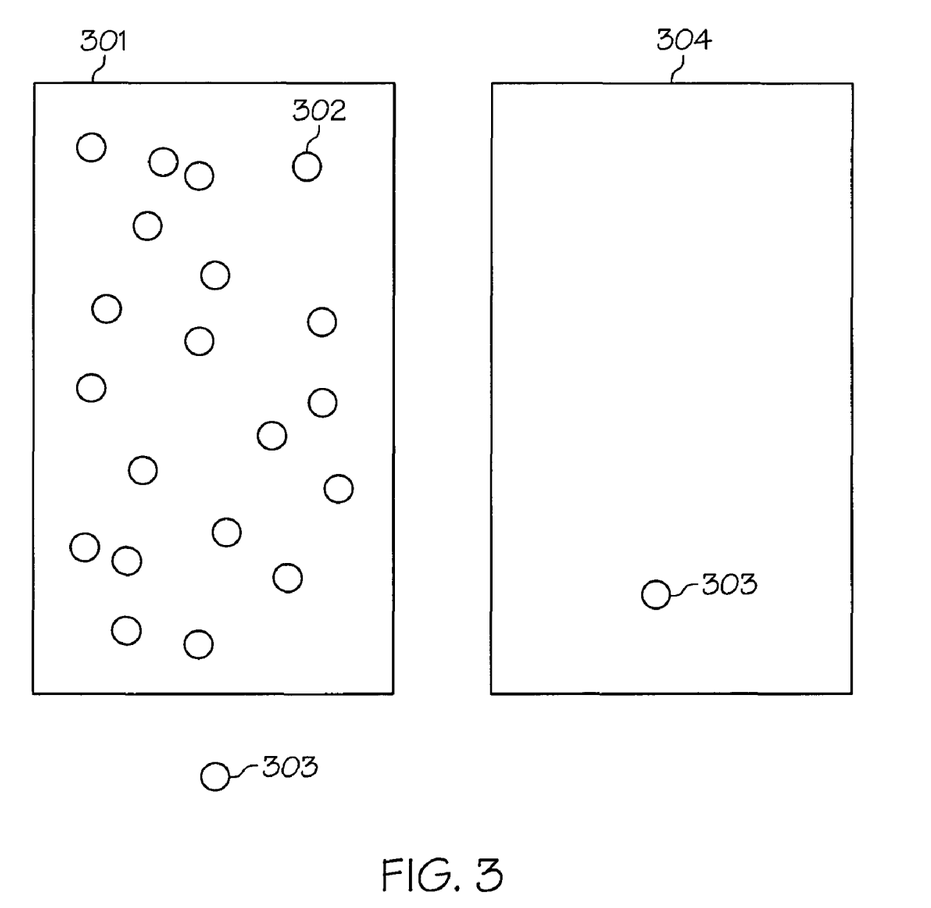
FIG. 3 is a diagram of increasing a capacity of a virtual space by spawning a replicate new virtual space according to an example embodiment of the present invention.

FIG. 3 shows a diagram of increasing a capacity of a virtual space by spawning a replicate new virtual space according to an example embodiment of the present invention. The diagram shows a virtual space 301 that has a number of avatars 302 in the virtual space 301. In this example embodiment, twenty avatars are shown in the virtual space 301, however, embodiments according to the present invention are not limited to any specific number of avatars being in a virtual space. In this example embodiment, the number of avatars in the virtual space is at an allowable number of avatars where it may be desired that no more avatars be allowed into the virtual space 301. When a new avatar 303 (i.e., twenty-first avatar) desires access to the virtual space 301, the capacity of the virtual space 301 may be automatically increased by spawning a replicate new virtual space 304. Therefore, the new avatar 303 (i.e, twenty-first avatar) may then access and enter the newly spawned replicate virtual space 304. The replicate virtual space 304 may be identical and provide the same resources, services, etc. as the original virtual space 301. Should some avatars 302 leave the original virtual space 301 and other new avatars desire entry to the virtual space 301, they may be given access to the original virtual space 301 or to the newly spawned replicate virtual space 304. The newly spawned replicate virtual space 304 may reside on a same server as that hosting the original virtual space 301 or on a different server.

Figure 4:
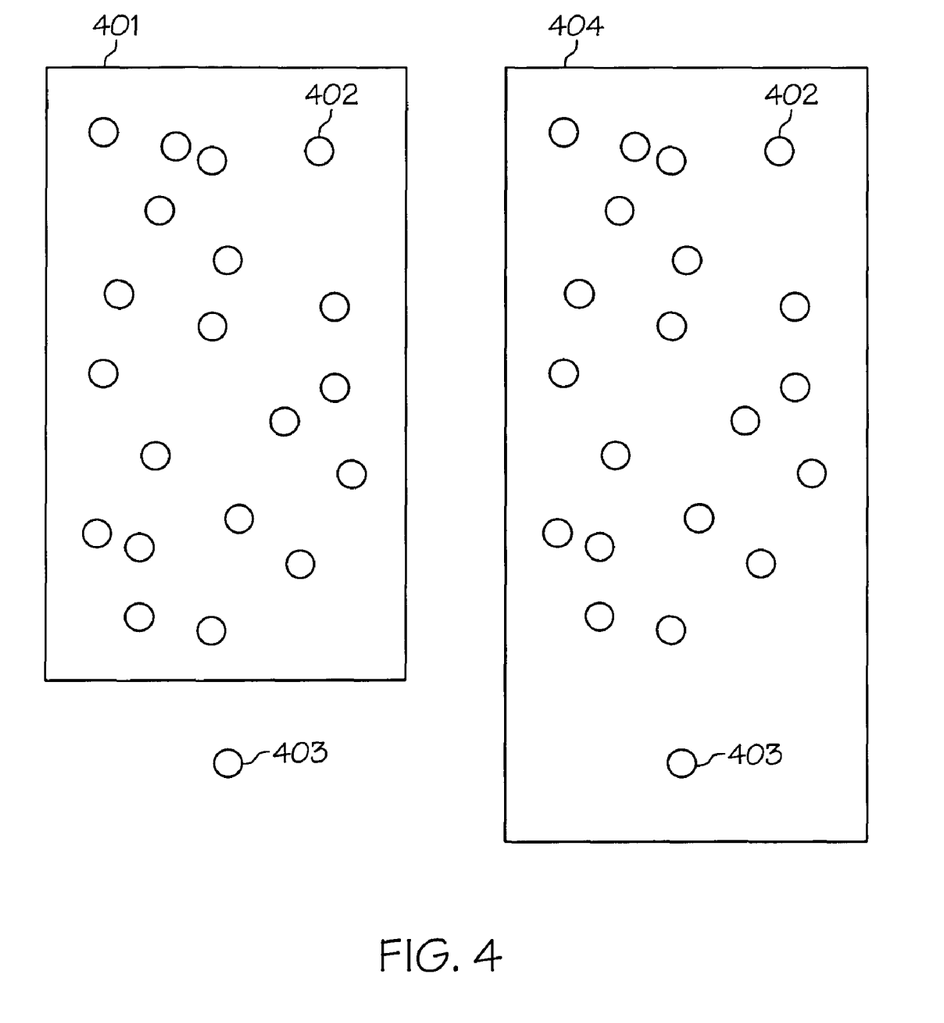
FIG. 4 is a diagram of increasing a capacity of a virtual space by expanding a size of the virtual space according to an example embodiment of the present invention.

FIG. 4 shows a diagram of increasing a capacity of a virtual space by expanding a size of the virtual space according to an example embodiment of the present invention. The diagram shows a virtual space 401 that has a number of avatars 402 in the virtual space 401. In this example embodiment, twenty avatars are shown in the virtual space 401, however, embodiments according to the present invention are not limited to any specific number of avatars being in a virtual space. In this example embodiment, the number of avatars in the virtual space is at an allowable number of avatars where it may be desired that no more avatars be allowed into the virtual space 401. When a new avatar 403 desires access to the virtual space 401, since the virtual space 401 currently has an allowable number of avatars in the virtual space 401, a capacity of the virtual space 401 may be increased by a expanding a physical size of the virtual space 401 as shown in the expanded virtual space 404 with increased physical space. The new avatar 403 may then be allowed to enter the expanded virtual space 404 with increased physical space along with the avatars 402 in the original virtual space 401.

Figure 5:
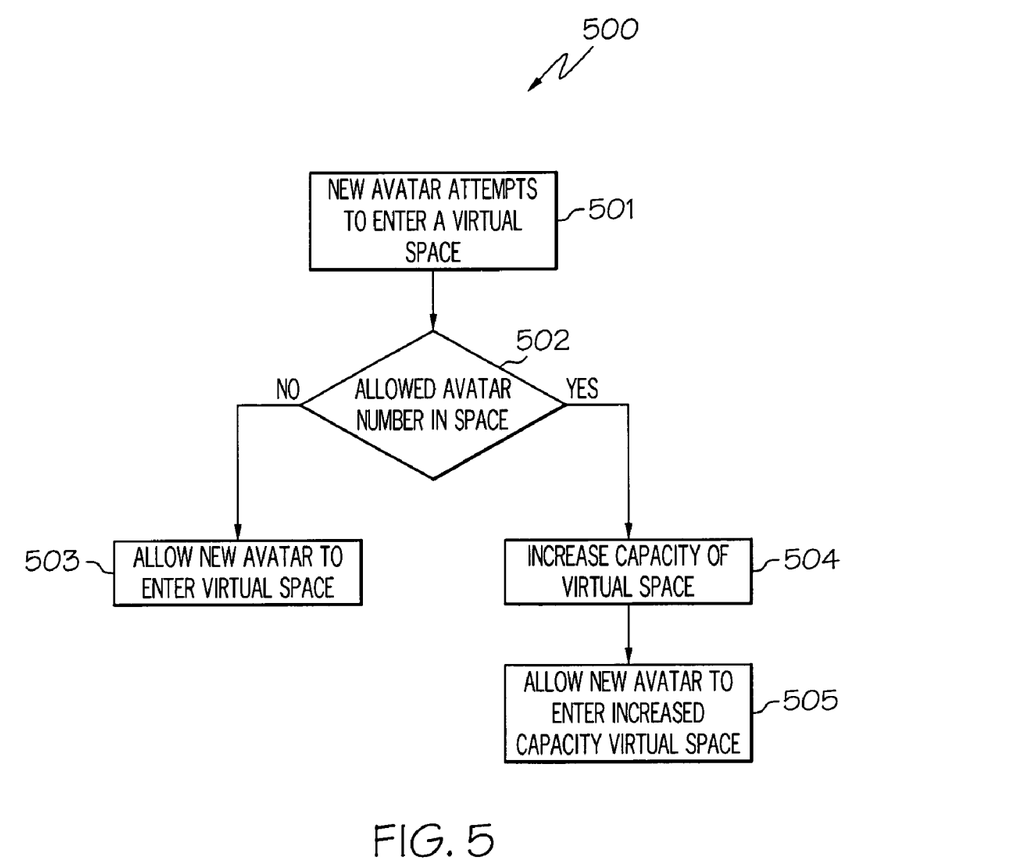
FIG. 5 is a flowchart of a process for increasing a capacity of a virtual space in a virtual world according to an example embodiment of the present invention.

FIG. 5 shows a flowchart of a process for increasing a capacity of a virtual space in a virtual world according to an example embodiment of the present invention. In the process 500, in block 501 a new avatar attempts to enter a virtual space. In block 502, it may be determined if an allowable number of avatars currently exist in the virtual space and if not, in block 503 a new avatar desiring entry into the virtual space may be allowed entry into the virtual space. If it is determined that the allowable number of avatars currently exist in the virtual space, then in block 504, a capacity of the virtual space may be increased. In block 505, the new avatar desiring entry into the virtual space may be allowed to enter the increased capacity virtual space.

Figure 6:
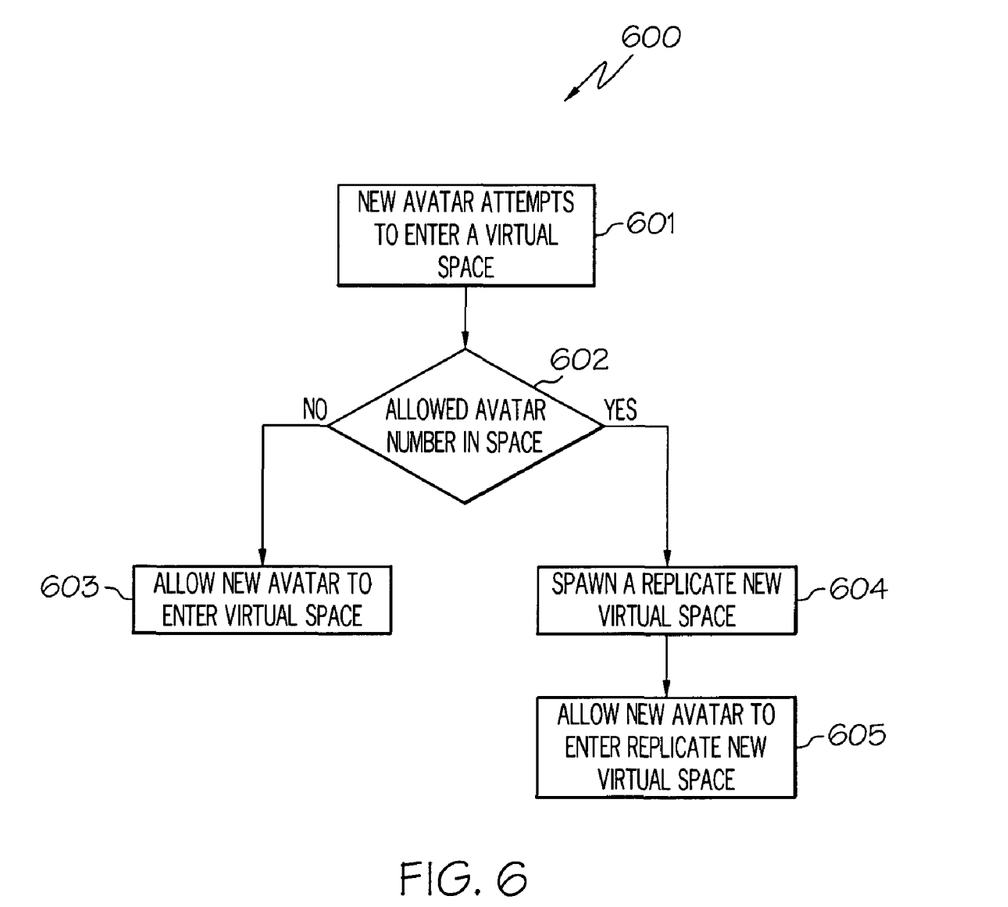
FIG. 6 is a flowchart of increasing a capacity of a virtual space by spawning a replicate new virtual space according to an example embodiment of the present invention.

FIG. 6 shows a flowchart of increasing a capacity of a virtual space by spawning a replicate new virtual space according to an example embodiment of the present invention. In the process 600, in block 601, a new avatar may attempt to enter a virtual space. In block 602 it may be determined if an allowable number of avatars already currently exist in the virtual space and if not, in block 603 the new avatar may be allowed to enter the virtual space. If it is determined that an allowable number of avatars currently exist in the virtual space, in block 604, a replicate new virtual space may be automatically spawned from the original virtual space. Then in block 605, the new avatar may be allowed entry into the replicate new virtual space.

Figure 7:
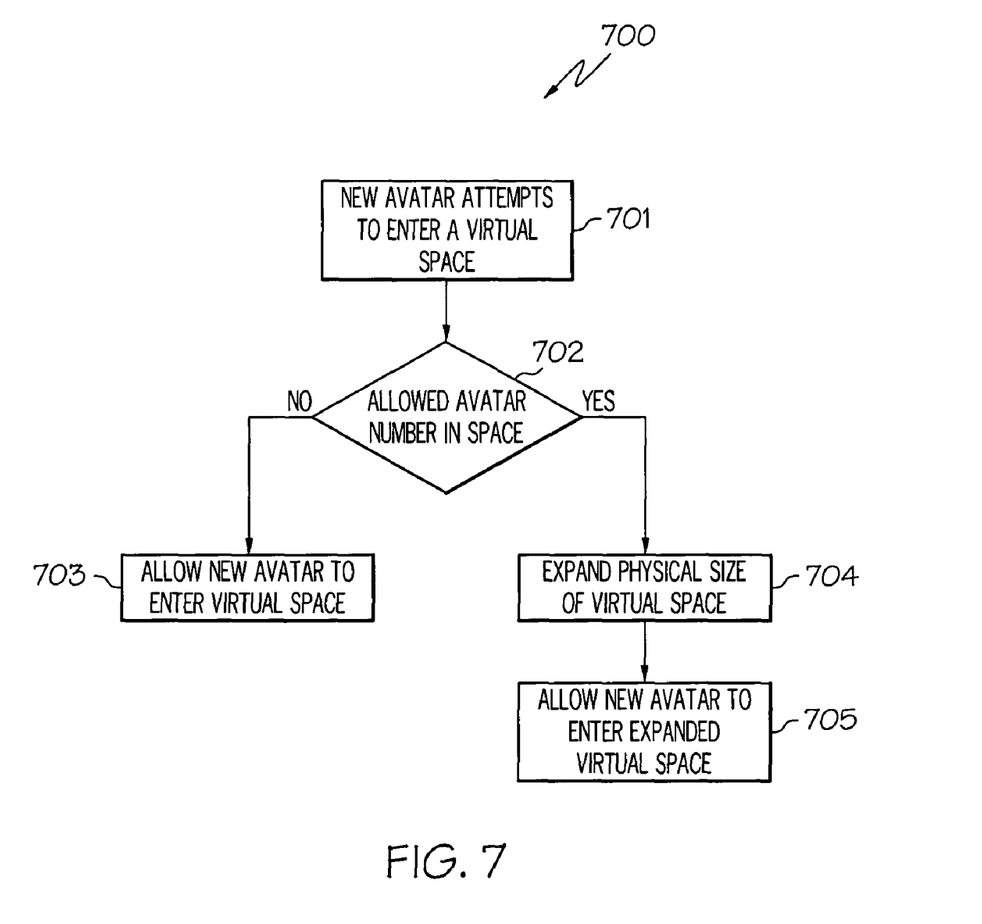
FIG. 7 is a flowchart of a process for increasing a capacity of a virtual space by expanding a physical size of the virtual space according to an example embodiment of the present invention.

FIG. 7 shows a flowchart of a process for increasing a capacity of a virtual space by expanding a physical size of the virtual space according to an example embodiment of the present invention. In the process 700, in block 701, a new avatar may desire entry into a virtual space. In block 702, it may be determined if an allowable number of avatars already currently exist in the virtual space and if not, in block 703, the new avatar may be allowed to enter the virtual space. If it is determined that an allowable number of avatars already currently exist in the virtual space, in block 704, a physical size of the virtual space may be automatically expanded. Then in block 705, the new avatar may be allowed to enter the expanded virtual space.

Figure 8:
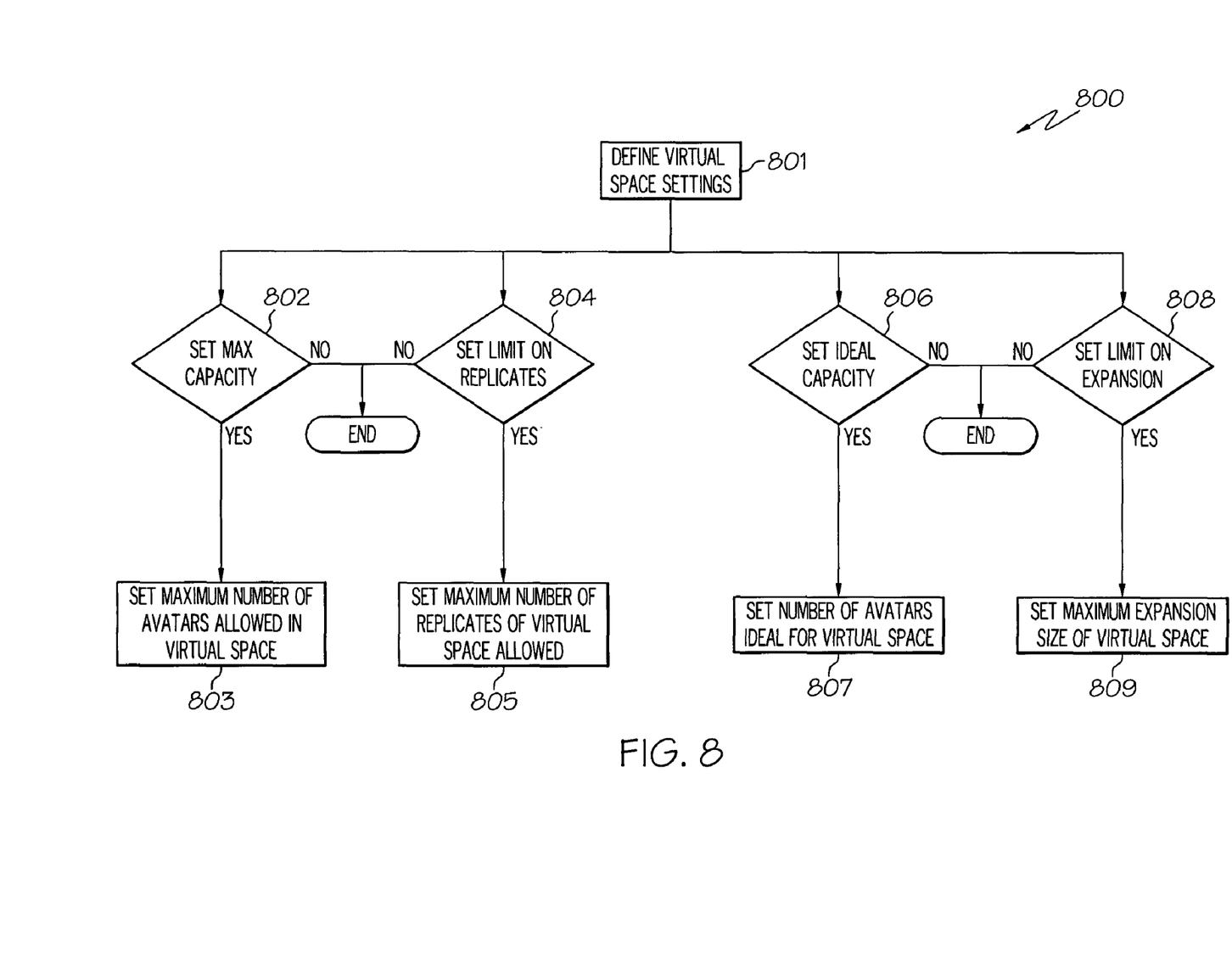
FIG. 8 is a flowchart of a process for defining virtual space settings according to an example embodiment of the present invention.

FIG. 8 shows a flowchart of a process for defining virtual space settings according to an example embodiment of the present invention. In the process 800, in block 801, it may be desired to define settings for a virtual space. In block 802 it may be determined if it is desired to set a maximum allowable avatar capacity value for the virtual space and if not, the process ends. If it is desired to set a maximum allowable avatar capacity for the virtual space, in block 803, a value for a maximum number of avatars allowed to enter the virtual space may be set.

In block 804 it may be determined if it is desired to set a limit on a number of spawned replicate new virtual spaces and if not, the process ends. If it is desired to set a limit on a number of spawned replicate new virtual spaces, in block 805, a maximum number of allowable replicates of the virtual space may be set. In block 806 it may be determined if an ideal allowable capacity of avatars in a virtual space is desired to be set and if not, the process ends. If an ideal allowable capacity of avatars in a virtual space is desired to be set, in block 807, a value for a number of avatars ideal for the virtual space may be set. In block 808, it may be determined if it is desired to set a limit on a physical size expansion of the virtual space and if not, the process ends. If it is desired to set a limit on an expansion of the physical size of the virtual space, then in block 809 a maximum expansion size for the virtual space may be set.

Figure 9:
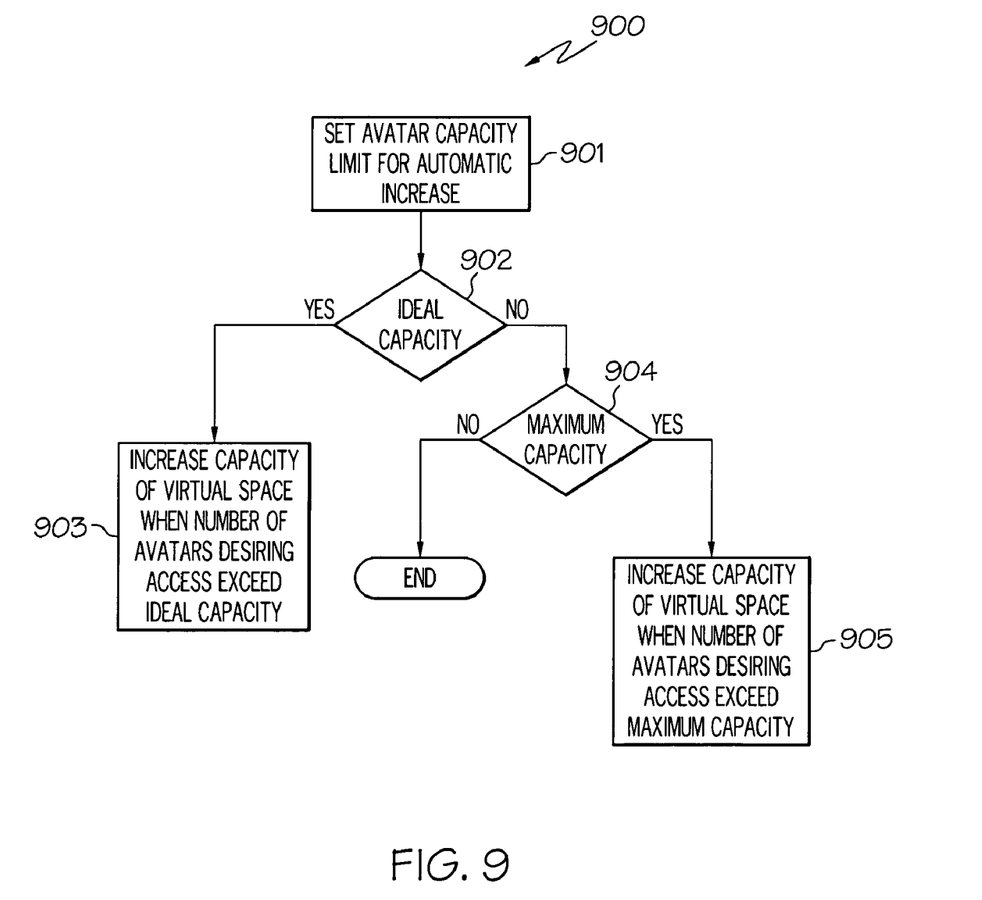
FIG. 9 is a flowchart of a process for setting an avatar capacity limit for automatic increase in capacity according to an example embodiment of the present invention.

FIG. 9 shows a flowchart of a process for setting an avatar capacity limit for automatic increase in capacity according to an example embodiment of the present invention. In the process 900, in block 901, it may be desired to set an avatar capacity limit that initiates an automatic increase in capacity for the virtual space. In block 902, it may be determined if an ideal avatar capacity limit is desired to be set and if so, in block 903, an automatic increase in the capacity of the virtual space may occur when the number of avatars desiring access to the virtual space exceeds an ideal capacity. If it is not desired to set an ideal avatar capacity, in block 904 it may be determined if it is desired to set a maximum avatar capacity limit and if not the process ends. If it is desired to set a maximum avatar capacity, then in block 905, a capacity of the virtual space may be automatically increased when a number of avatars desiring access to the virtual space exceed a maximum capacity of the virtual space.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for automatically increasing a capacity of a virtual space in a virtual world comprising:
   detecting an attempt by an avatar to enter a virtual space in a virtual world;
   determining if an allowable number of avatars are currently in the virtual space, wherein the allowable number of avatars is determined by at least a capacity of a server that is hosting the virtual space; and
   increasing a capacity of the virtual space when the allowable number of avatars is currently in the virtual space, wherein increasing capacity of the virtual space comprises spawning a replicate new virtual space on a different server in response to the capacity of the server that is hosting the virtual space reaching the allowable number of avatars.

2. The method according to claim 1, further comprising allowing the avatar to enter the increased capacity of the virtual space.

3. The method according to claim 1, further comprising setting a limit on the number of the replicate new virtual spaces that can be spawned.

4. The method according to claim 1, the virtual space comprising one of a store, a business, an arena, a building, a land area, or a room.

5. The method according to claim 1, further comprising setting the allowable number of avatars for the virtual space.

6. The method according to claim 1, further comprising setting the allowable number of avatars for the virtual space by at least one of an owner of the virtual space or a manager of the virtual space.

7. The method according to claim 1, further comprising the allowable number of avatars comprising a maximum avatar capacity for the virtual space.

8. The method according to claim 1, further comprising the allowable number of avatars comprising an ideal avatar capacity for the virtual space.

9. The method according to claim 1, further comprising defining at least one setting for the virtual space, the at least one setting comprising at least one of a maximum avatar capacity for the virtual space, an ideal avatar capacity for the virtual space, a limit on a number of replicate new virtual spaces that can be spawned from the virtual space, or a limit on an expansion of a size of the virtual space.

10. A method for automatically increasing a capacity of a virtual space in a virtual world comprising:
  determining if an allowable number of avatars are currently in the virtual space, wherein the allowable number of avatars is determined by at least a capacity of a server that is hosting the virtual space; and
  increasing a capacity of the virtual space when the allowable number of avatars are currently in the virtual space, wherein increasing capacity of the virtual space comprises spawning a replicate new virtual space on a different server in response to the capacity of the server that is hosting the virtual space reaching the allowable number of avatars.

11. The method according to claim 10, the virtual space comprising one of a store, a business, an arena, a building, a land area, or a room.

12. The method according to claim 10, further comprising the allowable number of avatars comprising a maximum avatar capacity for the virtual space.

13. The method according to claim 10, further comprising the allowable number of avatars comprising an ideal avatar capacity for the virtual space.

* * * * *